Figure 1:
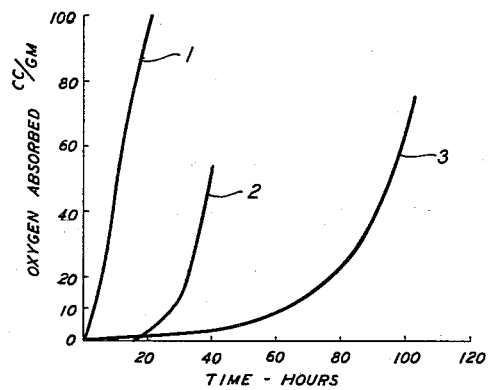

United States Patent Office 3,042,649
Patented July 3, 1962

3,042,649
COMPOSITION INCLUDING A SATURATED HYDROCARBON POLYMER STABILIZED WITH OXYGENATED OR SULFURIZED CARBON BLACK
Walter L. Hawkins, Montclair, and Field H. Winslow, Springdale, N.J., assignors to Bell Telephone Laboratories, Incorporated, New York, N.Y., a corporation of New York
Filed May 2, 1958, Ser. No. 732,468
7 Claims. (Cl. 260—41)

This invention relates to the stabilization of polymeric materials against oxidation by the inclusion therein of small amounts of carbon black particles which have been activated as described and to stabilized products so produced. The carbon blacks included in the inventive compositions herein have been activated in such manner as to include the addition of oxygen, sulfur or selenium to the surface of the particles.

The mechanism of oxidative deterioration toward which the stabilizers of this invention are directed is known as "thermal oxidation." This type of oxidative deterioration may take place in the absence of ultraviolet light and, as the name implies, is accelerated by an increase in temperature. Although this invention is not specifically directed to the minimization of degradation due to that form of deterioration known as "ultraviolet oxidation," on the basis of the unchanged appearance of the carbon black particles after activation in accordance with this invention, it is expected that these particles will continue to serve their well-known function of acting as an ultraviolet light shield.

Polymeric compositions which are benefited by the inclusion of activated carbon black particles in accordance with this invention include all of the essentially saturated hydrocarbon polymeric materials. This grouping includes: polymers containing tertiary hydrogen atoms such as polyethylene, having random tertiary atoms; polypropylene, containing ordered tertiary atoms; as well as almost completely linear polymers such as low pressure polyethylene produced by ionic catalysis; and materials containing only secondary hydrogen atoms such as polyisobutylene. Materials protected in accordance with this invention include copolymers as well as homopolymers and mixtures of polymers, copolymers or both. Copolymers protected in accordance with this invention include all the known types such as ordered, block, graft and random copolymers.

Polymeric materials of this invention need not be crystalline or microcrystalline but may be amorphous or even liquid providing the viscosity of the material is sufficiently high to hold the protective materials here described in suspension for a sufficient period of time. Examples of polymeric materials included in the compositions of this invention are: the polymers of butene-1, 3-methyl butene-1, 4-methyl pentene-1, 4,4-dimethyl pentene-1, dodecene-1, and 3-methyl pentene-1; the copolymers of ethylene and various alpha-olefins such as propane and butene-1; the copolymers of styrene and various olefins such as isobutylene and; waxes such as paraffin and other paraffin petroleum waxes, ozokerite, ceresin and microcrystalline petroleum waxes.

Although the most common polymeric materials falling within the class above outlined are the polymerization products of monomers containing four or fewer carbon atoms, polymerized products of higher order monomers may also be stabilized in accordance with this invention providing they have the other characteristics described.

The effect of oxidative deterioration on polymeric materials of the class set forth is generally known. In general, oxidative breakdown is a two-step process including a first primary oxidation of a vulnerable link in the polymer chain, such as at a tertiary hydrogen should one be present, and a second step in which the links so oxidized attack another part of the chain so as to result in rapid autocatalytic breakdown of the polymer. In general, it is the function of any added stabilizing material or antioxidant, not to interfere with primary oxidation, but to somehow combine with the oxidation product so produced as to deactivate it and prevent autocatalytic breakdown.

The seriousness of this problem has resulted in a broad research program and in the development of a multitude of stabilizing materials. Up to very recently most of these materials were secondary amines of resonant structures. Although these materials were found to be suitable as thermal antioxidants, it was found that their effectiveness was severely impaired or lost where carbon black particles were also included in the polymer as for the purpose of protecting against deterioration due to ultraviolet radiation.

More recently it has been found that certain types of sulfur-containing compounds including both aromatics and non-aromatics retain their effectiveness as thermal antioxidants and sometimes show a synergistic effect in the presence of carbon black particles. See, for example, Journal of Polymer Science, vol. 28, No. 117, page 439, March 1958.

In accordance with the present invention it has been found that carbon black particles activated by the addition of oxygen, sulfur or selenium provide a high degree of protection against thermal oxidation to polymeric materials in which they are incorporated. In accordance with this invention such polymeric products are stabilized against this effect without the inclusion of a phenolic, secondary amine, or other type of chemical antioxidant material. Activated carbon blacks suitable for use herein include oxygenated particles which have been heated in an oxygen-containing atmosphere so as to increase their volatile content and materials activated by sulfurization or the addition of selenium including physical mixtures of carbon and sulfur or selenium as well as heated mixtures of the same materials.

The advantages gained by the use of the compositions of this invention are appreciated by reference to the following figures in which:

FIG. 1 on coordinates of oxygen absorbed against time is a plot including data taken from an accelerated test indicating the rate of oxidation of three samples of polyethylene, one pure, one containing a commercial channel carbon black, and one containing the same type of channel black which has, however, been oxygenated so as to increase its volatile content to 15 percent.

Figure 2:
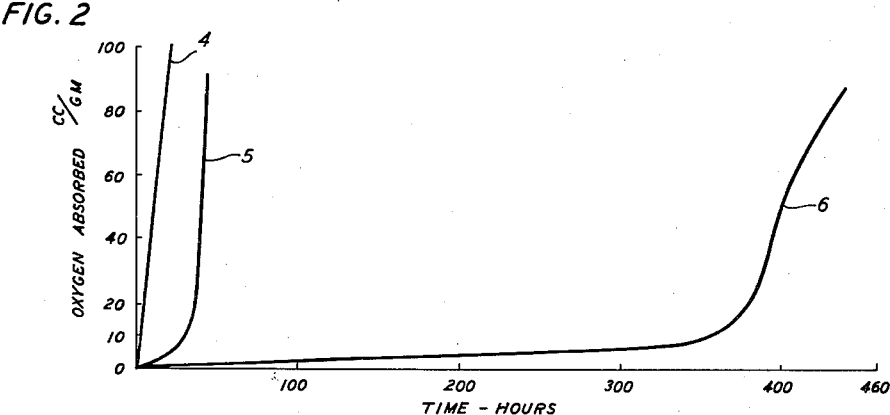
Figure 3:
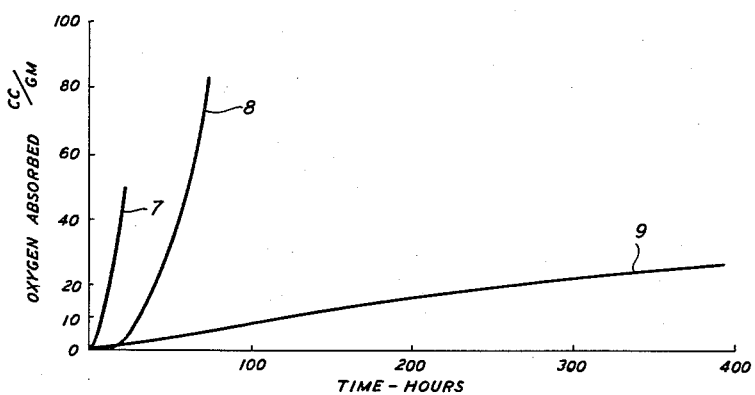
Figure 4:
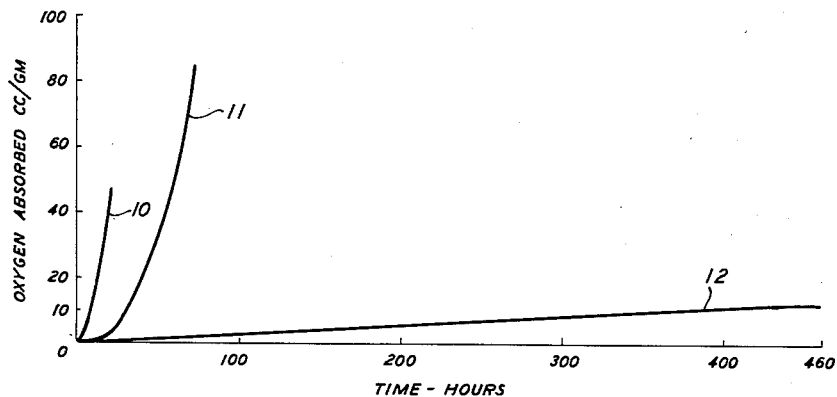
Figure 5:
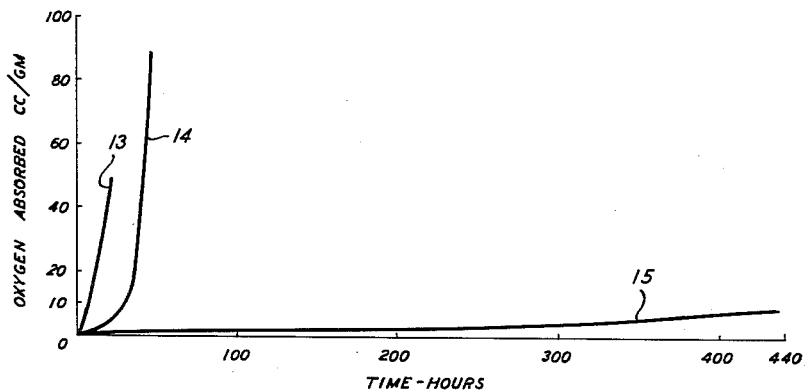
Figure 6:
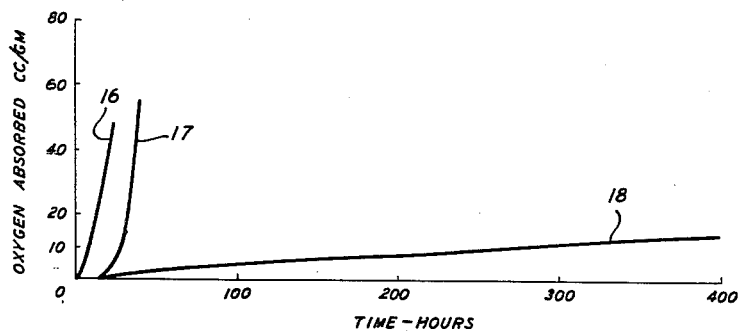
Figure 7:
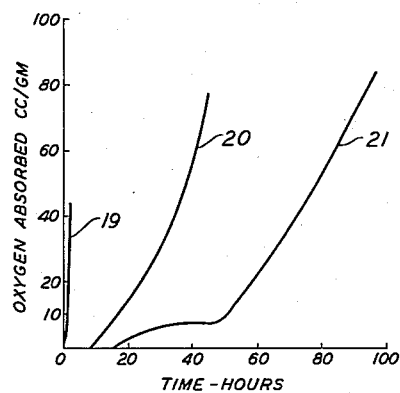
Figure 8:
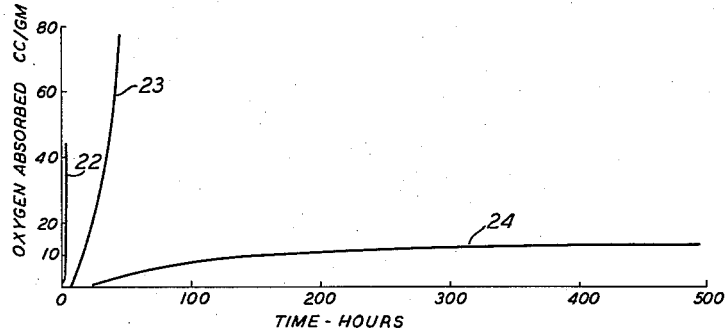
Figure 9:
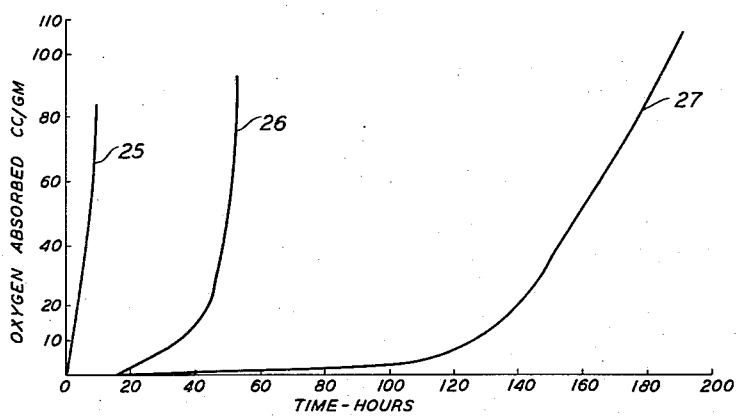
Figure 10:
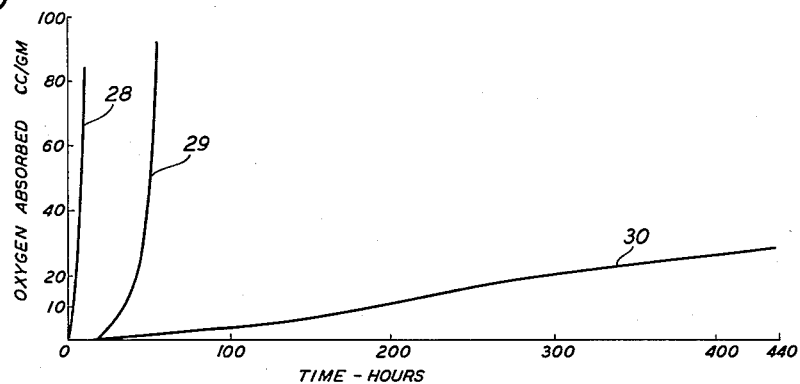
Figure 11:
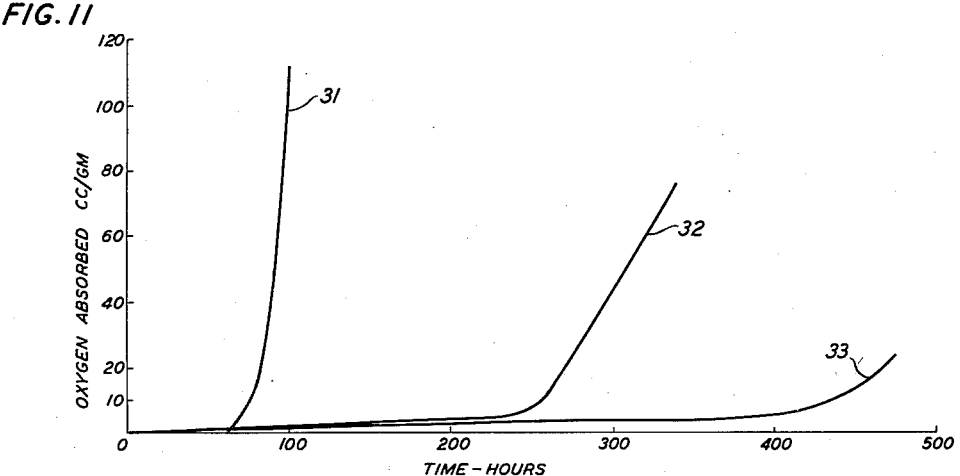

FIG. 2 on similar coordinates is a plot of the rate of oxygen absorption by three polyethylene samples, one pure, one containing a different commercial channel black, and a third containing a corresponding activated channel black having a 25 percent volatile content;

FIG. 3 on the same coordinates is a plot which indicates the relative rates of oxidation of three samples of conventional polyethylene, the first containing no additives, the second containing a commercially available channel black, and a third containing a physical mixture of the same type of channel black together with sulfur;

FIG. 4 on the same coordinates is a plot showing the relative rates of oxidation of a pure sample of conventional polyethylene, of a sample of the same polymer containing a commercially available channel black and of another sample of that polymer containing the same type of carbon black which was, however, activated by pyrolysis in the presence of sulfur so as to result in a 4.7 percent sulfur content;

FIG. 5 is the same type of plot showing relative oxidation rates for a first control sample of conventional polyethylene, for a second such sample containing a commercially available channel black, and for a third such sample containing the same type of carbon black however activated to an 8 percent sulfur content;

FIG. 6 in similar coordinates is a plot which indicates the same type of comparative data for three samples of polyethylene, one containing no additives, one containing a standard channel black, and a third containing a physical mixture of the same type of carbon black with selenium;

FIG. 7 is a plot on the same coordinates of oxygen absorbed against time which indicates the relative rates of oxidation of three samples of polypropylene, the first containing no additives, the second containing channel black, and the third containing the same type of channel black oxygenated so as to have a 15 percent volatile content;

FIG. 8 on the same coordinates is a plot which illustrates the rates of oxidation of three samples of polypropylene, one containing no additive, one containing channel black, and one containing channel black which has been activated in the presence of sulfur so as to result in an 8 percent sulfur content;

FIG. 9 is a similar plot for three high density polyethylenes; the first containing no additive, the second containing a commercially available channel black, and the third containing an oxygenated channel black of the same type having a 15 percent volatile content;

FIG. 10 is a plot which contains curves, for a first sample of high density polyethylene containing no additive, for a second sample of the same polymer containing a commercially available channel black, and for a third sample of the same polymer containing a channel black activated in the presence of sulfur so as to result in an 8 percent sulfur content; and FIG. 11 on the same coordinates is a plot which contains three such curves, one corresponding with a sample of polyisobutylene containing no additive, a second corresponding with a sample of the same polymer containing a commercially available untreated channel black, and a third corresponding with such a sample containing a channel black which has been activated in the presence of sulfur so resulting in an 8 percent sulfur content.

The data represented by the curves of all of the figures are taken from a standard accelerated aging test for polymeric materials. Such tests are well known and data taken therefrom is of known significance. To aid in the description of these figures, an outline of the accelerated testing procedure used is set forth below.

*Accelerated Test Procedure*

The saturated hydrocarbon polymer, together with carbon black, activated or unactivated, where required, was prepared by mill-massing on a six-inch by 12-inch two-roll mill having roll speeds of approximately 25 and 35 r.p.m., with the rolls at a suitable temperature for the polymer concerned. A list of the polymers tested together with appropriate roll temperatures, is set forth below. Where carbon black was to be included, a direct mix of 97 parts of polymer and 3 parts of carbon black was made up. (Where a large number of tests are to be conducted simultaneously, it is convenient to first prepare a master batch of polyethylene containing 25 percent by weight of carbon black and to cut it back by dilution after first milling.)

Test sheets of the polymeric material containing any carbon black specified were molded to a thickness of approximately 50 mils, and 14 millimeter diameter discs were cut from these sheets. Four such discs, each in a shallow glass cup, were placed in a Pyrex glass tube attached to a mercury manometer together with about 2 grams of powdered barium oxide or similar absorbent. The reaction vessel, after being successively evacuated and filled with oxygen to assure complete oxygen environment was again filled with oxygen and was placed in an air-circulating strip-heater oven maintained at a temperature specified below for the patricular polymeric material being tested. The oven was of such design as to assure a variation of no more than 1° C. throughout the entire volume contained. The reaction vessel was immediately connected to an oxygen gas burette with a short length of polyvinyl chloride tubing. After reaching temperature equilibrium at the specified temperature, the system was adjusted to zero reading at atmospheric pressure. Readings of oxygen uptake were made as required at atmospheric pressure, one such reading being made every 4 to 12 hours.

| Polymers Tested | High Pressure Polyethylene | Low Pressure Polyethylene | Polypropylene | Polyisobutylene |
|---|---|---|---|---|
| Tradename | DYNK | Marlex 50 | | Oppanol B-50 |
| Supplier | Bakelite Corp. | Phillips Petroleum Co. | Hercules Powder Co. | Badische Analin Soda-Fabrik A.G. |
| Density | 0.92 | 0.958-0.962 | 0.90-0.91 | 0.93 |
| Roll Temperature | 120° C | 160° C | 175° C | 45° C |
| Furnace Temperature | 140° C | 140° C | 120° C | 120° C |

As a check on the validity of the conclusions here reported, the antioxidant effectiveness of various groups of activated and unactivated carbon black materials was tested. On the assumption that a 5 percent by weight absorption of oxygen can be tolerated, it was found that 3 percent by weight of any of four unactivated carbon blacks, three channel and one furnace, all resulted in a protective period of about thirty hours for high pressure polyethylene oxidized at 140° C. In addition to these four unactivated carbon blacks, three commercially available activated materials were tried. The following table contains a listing of all commercial carbon black materials used.

*Commercial Carbon Black Materials Tested*

| Carbon Black | Type | Supplier | Particle Size, angstroms | Volatile Contact, percent | Analysis |
|---|---|---|---|---|---|
| Kosmos BB | Channel | United Carbon Co. | 180 | 6.5 | |
| Peerless #1 | do | Columbian Carbon Co. | 190 | 5 | |
| Degussa FW-1 | do | Degussa | 120 | 7.6 | |
| Statex-125 | Furnace | Columbian Carbon Co. | 190 | 1.4 | |
| Peerless #2 | O₂ Activated Channel | do | 190 | 15 | |
| Degussa FW-2 | do | Degussa | ~120 | 25 | |
| Degussa CK2/S | S-Activated Channel | do | ~300 | 7.6 | 8% sulfur |
| Peerless #3 | Deactivated Channel | Columbian Carbon Co. | 190 | 0.3 | |

Where possible, in the tests reported in the accompanying figures, an attempt was made to use paired blacks; that is, materials having the same particle size and the same basic method of preparation for both the activated and the unactivated materials. Paired materials set forth in the table above include: Peerless No. 1 and Peerless No. 2; and Degussa FW–1 and Degussa FW–2. This convention was followed also where the activated materials used were not commercially available so that, for example, the figure reporting the use of a sulfur activated Kosmos BB utilized Kosmos BB also as the unactivated material.

The considerations that dictate the particle size of carbon black to be included in the polymeric compositions herein for use as an ultraviolet light shield are well known to those skilled in the art. In general, where a relatively small amount of carbon black material is to be included, the use of particle sizes of over about 1000 angstroms precludes the possibility of good dispersion. In accordance with the instant invention, in which the same particles as activated perform the function of a thermal antioxidant, the same considerations apply. Where the amount of carbon black to be included is of the order of from 0.5 to 5 percent by weight, good dispersion is realized only where the particle size is kept below the limit of about 1000 angstroms. The use of particles appreciably greater than this limit for the same percentage inclusion results in substantial gaps between particles and the statistical unlikelihood that a particle will be within striking distance of an oxidized portion of the polymer chain.

The degree of thermal antioxidant effectiveness of activated carbon black particles is, to some extent, predictable on the basis of the physical size of the particles themselves, assuming good dispersion at all times. In general, where the particle size is in excess of 1000 angstroms, a good protective period may still be secured by adding more than 5 percent by weight of such material. From the protective standpoint, there is, of course, no objection to adding amounts greatly in excess of 5 percent, regardless of particle size. Such excessive additions are, however, accompanied by the usual drawbacks as, for example, by smudging of objects with which the polymer comes in contact. Addition of activated carbon black particles in amounts of less than about 0.5 percent by weight results in a decreased protective period. Nevertheless, a protective period of the magnitude of those reported herein, may be obtained for such small additions by the use of smaller particle sizes as, for example, of particles of less than about 100 angstroms in size.

Activated carbon blacks included in the compositions reported herein are of three general types: those activated in the presence of oxygen; those activated in the presence of sulfur; and those activated in the presence of selenium.

In accordance with conventional terminology the degree of activation of carbon black particles which have been activated by the inclusion of oxygen, is discussed in terms of volatile content. A brief outline of a common procedure for measuring volatile content is set forth below.

*Determination of the Volatile Content of Carbon Black*

A platinum crucible, together with cover, is first heated at 950° C. for one-half hour, is placed in a desiccator and is there cooled to room temperature. The crucible is weighed. The sample of carbon black to be analyzed is dried for one hour at 105° C. The sample of carbon black is placed in the crucible, the amount chosen being such as to permit adequate air space for expansion of escaping volatiles, thus preventing raising of the cover and possible oxidation of the black. The crucible cover and contents are weighed, the crucible is covered and is placed in an electric furnace maintained at 950° C. for a period of 7 minutes. The crucible is placed in a desiccator, is allowed to cool to room temperature and is weighed.

The percent volatile content is then calculated from the equation:

$$V = \frac{(B-C) \times 100}{(B-A)}$$

where $V$ = percent volatile
$A$ = weight of crucible and cover
$B$ = weight of crucible, cover and sample before heating
$C$ = weight of crucible, cover and sample after heating.

The procedure used for activating carbon black in the presence of oxygen is also well known. In general, this consists of pyrolyzing the carbon at a temperature of 900°–1100° C. for a period of about one hour in the presence of oxygen. For further details regarding such methods of activation see "Active Carbon," by John W. Hassler, 1951, Chemical Publishing Company, Inc., at pages 15 et seq. It has been found that a volatile content of 10 percent or greater for carbon black materials activated in the presence of oxygen is suitable for the practice of this invention. As is discussed, an increase in volatile content for carbon black material so activated above 10 percent by weight results in still further improvement in the protective period afforded the polymeric composition. The accompanying figures include data taken from runs conducted on polymeric compositions containing carbon black materials having a volatile content of up to 25 percent by weight. A further increase results in further improvement, although preparation of black materials containing in excess of 25 percent volatile content are not generally commercially available and are expensive to prepare.

Sulfur and selenium content of black materials activated in the presence of such materials is expressed in terms of percent by weight of the activating material. Samples of sulfur-activated material reported herein contain from 4.7 percent to 8 percent by weight of sulfur. As is discussed, the relative magnitudes of the protective periods afforded the polymeric compositions by blacks containing either of these amounts of sulfur, indicate that little advantage is gained by utilizing greater than an amount of sulfur in this range. Since the doubling of the sulfur content does not result in an increase in the protective period approaching that afforded by the polymeric material by activation of the carbon black to the lower limit of sulfur content, it is theorized that the sulfur atoms here of interest are chemisorbed with a certain excess amount of sulfur only physically absorbed and not taking part in the protective mechanism. No reliance is had on this hypothesis. In general, a sulfur or selenium content of at least one percent by weight is preferred. The upper limit which may exceed 8 percent is determined by the economic feasibility of preparing such material.

A method for sulfur activation of carbon black materials found suitable in the practice of this invention, and the method which was used in the preparation of the sample containing 4.7 percent by weight of sulfur herein reported is outlined below.

*Activation of Carbon Black by Sulfurization*

A mixture of the desired proportions of carbon black and sulfur were sealed in a glass tube in a nitrogen atmosphere. The reaction vessel was then heated in a muffle furnace at 600° C. for two hours. Hydrogen sulfide was evolved and a small amount of yellow to red condensate collected in the cool area of the tube. This condensate was largely an aqueous solution of sulfur. Carbon black so activated was then analyzed in accordance with known analytical procedures. Extraction with boiling toluene for several hours was not found to lower the sulfur content.

Sulfurization of carbon black is well known. Literature references to exemplary procedures include:

(1) Wibault, J. B., Rec. Trav. chim. Pays-Bas, 38, 1959 (1919)
(2) Wibault, J. B., Proc. K. Akad. Wetensch, Amsterdam 24, 92 (1921)
(3) Wibault, J. B., Rec. Trav. chim. Pays-Bas 41, 153 (1922)
(4) Wibault, J. B., Brennst Chemie, 3, 273 (1922)
(5) Siebeneck, H., Petroleum, 18, 281 (1922)
(6) Enoksson, B., and Wetterholm, A., Acta chem. scand. 1, 889 (1947)
(7) Thiessen, G., "Chemistry of Coal Utilization," by Lowry, H. H., 1945, P. 444 (London: Chapman & Hart Ltd.)

Each of the attached figures contains curves plotted from accelerated tests run on comparative samples of polymeric materials. Oxygen absorption is measured in terms of cubic centimeters per gram and is a measure of the degree of oxidation of the sample. For the purpose of this description, and in accordance with conventional practice in the cable industry, it is assumed that a degree of oxygen absorption of 5 percent by weight is the maximum amount which may be tolerated without resulting in severe degradation of the polymer. This tolerable limit of 5 percent by weight corresponds with 10 cubic centimeters per gram in terms of the ordinate units of the accompanying figures.

All curves on any given figure have reference to samples taken from a single batch of a given polymeric sample, all simultaneously exposed in the given test apparatus at the prescribed temperature. Each set of curves includes one corresponding with a standard sample of such polymer containing no additives of any kind. A second such curve included on each figure includes such a polymeric sample containing an unactivated carbon black material. In each instance the carbon black material is commercially available and the commercial tradename, if any, and supplier, are indicated. A third such curve included in each figure, has reference to such a polymeric sample containing the same amount of carbon black (3 percent by weight) which has, however, been activated as described. Some of the activated materials included are commercially available in which instances tradename and supplier are set forth. Some of the other materials are not commercially available. Their method of preparation is indicated. Insofar as was feasible, the unactivated and activated carbon blacks included in the polymeric samples for any given figure were of the same type and particle size. In certain instances, where commercially available activated materials were used, the unactivated prototype materials were unavailable. However, as indicated above, the protective period afforded by all types and particle sizes of unactivated carbon black materials included in the experiments which are the basis for the accompanying figures, were found to be of approximately the same magnitude. As is evident from the standard curve of each of the accompanying figures, the protective period so afforded the polymeric product by the use of such unactivated materials was found to be quite short.

Referring again to FIG. 1, tests reported in this figure were run at 140° C. The polymer tested was high pressure polyethylene sold under the tradename of DYNK. Curve 1 has reference to such a polymeric sample containing no additives. In accordance with this curve, the sample absorbed 10 cc. per gram of oxygen after four hours of exposure time. Curve 2 has reference to a DYNK sample containing 3 percent of Peerless No. 1 channel black. This sample had absorbed 10 cc. per gram of oxygen after an exposure time of approximately 28 hours. Curve 3 of this figure has reference to a DYNK sample containing 3 percent by weight of Peerless No. 2 oxygenated carbon black having a volatile content of 15 percent. The protective period afforded this polymer by such inclusion in accordance with the above convention was 62 hours, said period corresponding with a 10 cc. per gram absorption of oxygen.

The tests reported in FIG. 2 relate to a sample of low density polyethylene (DYNK) and were run at 140° C. Curve 4 of this figure is similar to curve 1 of FIG. 1 and indicates a protective period of four hours for an unprotected polymeric sample. Curve 5 of FIG. 2 corresponds with the DYNK sample containing 3 percent by weight of Degussa FW–1 channel black. This sample absorbed 10 cc. per gram of oxygen after about 28 hours of exposure. The sample corresponding with curve 6 contained 3 percent by weight of Degussa FW–2 oxygenated carbon black having a volatile content of 25 percent. This sample showed an oxygen uptake of 10 cc. per gram only after an exposure time of about 356 hours.

The tests from which the data for FIG. 3 was taken correspond with 140° C. accelerated tests run on three DYNK low density polyethylene samples. The first of these corresponding with curve 7 and containing no additives showed an oxygen uptake of 10 cc. per gram after about 8 hours of exposure. The second such sample corresponding with curve 8 contained 3 percent by weight of Kosmos BB channel black. This sample had absorbed 10 cc. of oxygen per gram of polymeric product after about 30 hours of exposure time. The sample corresponding with curve 9 contained 3 percent by weight of a physical mixture of 9 parts of Kosmos BB and 1 part of sulfur of the type known as "flowers of sulfur" or "sublimed sulfur." This sample had absorbed the critical limit of oxygen after about 118 hours of exposure.

The tests reported in FIG. 4 utilized a sample of DYNK low density polyethylene and were run at 140° C. Curve 10 of this figure corresponds with the standard sample of this polymer containing no additives. The protective period for such material was approximately 8 hours. Curve 11 corresponds with a sample of the same polymer containing 3 percent by weight of Kosmos BB channel black. The protective period for this polymeric product was about 29 hours. The sample corresponding with curve 12 of this figure contained 3 percent by weight of a mixture of 9 parts of Kosmos BB and 1 part of sulfur which had been pyrolyzed for 2 hours at 600° C. in nitrogen prior to compounding. The sulfur content for this black after pyrolysis was analyzed as 4.7 weight percent. This sample had absorbed 10 cc. of oxygen per gram of product only after approximately 360 hours of exposure.

The polymer utilized in the tests reported in FIG. 5 was DYNK low density polyethylene. The temperature at which the tests were conducted was 140° C. Curve 13, which corresponds with an unmodified sample of such polymer, shows a protective period of about 8 hours. The sample corresponding with curve 14 contained 3 percent by weight of Degussa FW–1 channel black and showed a protective period of about 28 hours. The sample corresponding with curve 15 contained 3 percent by weight of Degussa CK3/S sulfur-activated channel black. The polymeric sample so protected had absorbed 10 cc. of oxygen only after about 460 hours of exposure.

The tests reported in FIG. 6 were made utilizing the same type of polyethylene sample and were conducted at 140° C. Curve 16 corresponds with an unmodified sample of such polymer and shows a protective period of approximately 8 hours. The sample of curve 17 contained 3 percent by weight of Peerless No. 1 carbon black and showed a protective period of about 28 hours. Curve 18 corresponds with such a polymeric sample containing 3 percent by weight of a mixture of 9 parts of Peerless No. 3 carbon black and 1 part of powdered selenium. The sample so protected had absorbed 10 cc. of oxygen after about 260 hours of exposure.

The use of Peerless No. 3 black in place of Peerless No. 1 in curve 18 of FIG. 6 was dictated by studies unrelated to the instant invention. Subsequent tests have shown that the same degree of activation of Peerless No.

3 and No. 1 results in an antioxidant material having substantially uniform protective characteristics.

The tests reported in FIG. 7 were conducted utilizing 3 samples of polypropylene and were conducted at 120° C. The first containing no additives and corresponding with curve 19 absorbed 10 cc. of oxygen after about 2 hours of exposure. The sample corresponding with curve 20 contained 3 percent by weight of Peerless No. 1 channel black. This sample had absorbed 10 cc. of oxygen after about 17 hours of exposure. Curve 21 corresponds with a polypropylene sample containing 3 percent by weight of Peerless No. 2 channel black which is an oxygenated black having a volatile content of 15 percent. This sample had absorbed 10 cc. of oxygen after about 49 hours of exposure.

FIG. 8 corresponds with 120° C. accelerated tests run on three samples of polypropylene. Curve 22, which corresponds with an unmodified sample of such polymer, shows a protected period of about 2 hours. Curve 23 corresponds with such a sample containing 3 percent by weight of Peerless No. 1 channel black. This sample had absorbed 10 cc. of oxygen per gram of polymeric product after about 17 hours of exposure. Curve 24 of this figure corresponds with a polypropylene sample containing 3 percent by weight of Degussa CK3/S. As indicated above, this is a sulfurized carbon black produced by a channel process having an 8 percent by weight sulfur analysis. This sample had absorbed 10 cc. of oxygen after about 167 hours of exposure.

Accelerated tests run on three samples of high density polyethylene prepared by ionic catalysis (Marlex–50) are reported in FIG. 9. The temperature of exposure was 140° C. Curve 25 corresponds with an unmodified sample of such polymer. The protective period in accordance with the above convention was about 2 hours. Curve 26 corresponds with a Marlex–50 sample containing 3 percent by weight of Peerless No. 1 channel black. This sample had absorbed 10 cc. of oxygen per gram of polymeric product after 36 hours of exposure time. Curve 27 corresponds with a Marlex–50 sample containing 3 percent by weight of Peerless No. 2 which is an oxygen-activated channel black having a 15 percent volatile content. The protective period so afforded this polymer was 126 hours.

FIG. 10 corresponds with three 140° C. accelerated tests made on Marlex–50. Curve 28 of this figure, which corresponds with an unmodified sample of such polymer, indicates a two-hour protective period. Curve 29 corresponds with such a sample containing 3 percent by weight of Peerless No. 1 which is an unactivated channel black. This sample had absorbed 10 cc. of oxygen per gram of polymer after about 36 hours of exposure. Curve 30 corresponds with a sample of Marlex–50 containing 3 percent by weight of Degussa CK3/S having a sulfur analysis of 8 percent. This sample had absorbed 10 cc. of oxygen after 188 hours.

The data plotted in FIG. 11 was taken from accelerated tests conducted, using three samples of polyisobutylene (Oppanol B–50). Tests were conducted at 120° C. Curve 31 of this figure corresponds with a sample of polyisobutylene containing no additives. This sample had absorbed 10 cc. of oxygen per gram of polymer after and 76 hours. Curve 32 corresponds with a sample of polyisobutylene containing 3 percent by weight of Peerless No. 1 channel black. This sample had absorbed 10 cc. of oxygen per gram of polymer after 260 hours of exposure. Curve 33 corresponds with a sample of polyisobutylene containing 3 percent by weight of Degussa CK3/S (a sulfur-activated carbon black containing 8 percent by weight of sulfur). This sample had absorbed 10 cc. of oxygen per gram of polymer after about 437 hours of exposure.

The invention has necessarily been described in terms of a limited number of relatively simple embodiments. All polymeric samples specifically reported are simple homopolymers. All are commercially available. All protected materials contain only a single type of activated carbon black. Many variations are apparent.

Where it is desirable to use a minimum amount of activated carbon black but is necessary to secure the maximum protective period from ultraviolet degradation, activated carbon blacks and unactivated carbon blacks may both be incorporated in the polymeric product. The total amount of carbon black material so incorporated may be considerably above 5 percent by weight, depending upon the nature of the polymeric product and other considerations ordinarily taken into account in compounding a material to be exposed to ultraviolet radiation.

Where it is desirable to do so, more than one type of activated carbon black may be incorporated in the same product so, for example, such a material may contain both a sulfur-activated and oxygen-activated black. Other combinations which may be desirable include the use of activated carbon black, in accordance with the disclosure herein, together with one or more thermal antioxidants known to retain their effectiveness or even to show a synergistic effect in the presence of black.

Protection is afforded in accordance with this invention where the polymeric material is a homopolymer, a copolymer or a mixture of homopolymers, copolymers or combination, provided only that the product is properly classified as an essentially saturated hydrocarbon polymeric product.

What is claimed is:

1. A composition comprising an essentially saturated hydrocarbon polymeric material selected from the group consisting of polyethylene, polypropylene, polybutene-1, poly-3-methyl butene-1, poly-4-methyl pentene-1, poly-4,4-dimethyl pentene-1, polydodecene-1, poly-3-methyl pentene-1, copolymers of ethylene and an alpha-olefin selected from the group consisting of propane and butene-1, and copolymers of styrene and isobutylene, and carbon black particles of a maximum size of 1000 angstroms contained in an amount of from 0.5 percent to 5 percent by weight of the said polymeric material, the said carbon black particles being selected from the group consisting of oxygenated channel carbon black particles, oxygenated furnace carbon black particles, sulfurized channel carbon black particles, and sulfurized furnace carbon black particles, the said oxygenated carbon black particles having a volatile content of at least 10 percent essentially resulting from oxygenation, and the said sulfurized carbon black particles having a sulfur content of at least 1 percent by weight, the said sulfur content as determinable by analysis after toluene extraction.

2. The composition of claim 1 in which the said carbon black particles are oxygenated.

3. The composition of claim 1 in which the said carbon black particles are sulfurized.

4. The composition of claim 1 in which the said polymeric material is polyethylene.

5. The composition of claim 4 in which the said polymeric material is low pressure polyethylene.

6. The composition of claim 1 in which the said polymeric material is polypropylene.

7. The composition of claim 1 in which the said polymeric material is polyisobutylene.

References Cited in the file of this patent

UNITED STATES PATENTS

| 2,431,303 | Billmeyer | Nov. 25, 1947 |
| 2,582,510 | Stiratelli | Jan. 15, 1952 |
| 2,748,104 | Viohl | May 29, 1956 |
| 2,927,904 | Cooper | Mar. 8, 1960 |

OTHER REFERENCES

Raff et al.: "Polyethylene," Interscience Pub. Inc., New York, New York, page 402, 1956.